G. B. ARNOLD.

Sewing-Machines.

No. 6,159.

Reissued Dec. 1, 1874.

Witnesses:

Chas. A. Brannan

John R. Lippert

Inventor:

Geo. B. Arnold

UNITED STATES PATENT OFFICE.

GEORGE B. ARNOLD, OF NEW YORK, N. Y.

IMPROVEMENT IN SEWING-MACHINES.

Specification forming part of Letters Patent No. 28,139, dated May 8, 1860; extended seven years; Reissue No. 6,159, dated December 1, 1874; application filed July 22, 1874.

*To all whom it may concern:*

Be it known that I, GEORGE B. ARNOLD, of New York city, have invented a new and useful Improvement in a Machine for Making Ruffles; and I do hereby declare the following to be a full and correct description of the same, reference being had to the accompanying drawings.

The object of my improvement is twofold: first, to make a regular ruffle; second, to fasten the ruffle thus made by stitching it before it leaves the machine, whereby it will be finished for use.

It is desirable that a ruffle, whether made by hand or machinery, should be regular and uniform, inasmuch as it is to be used as an ornament, and its beauty depends, among other things, upon these qualities; and therefore any machine which will not make such a ruffle is practically valueless as a ruffling-machine.

A machine has heretofore been invented which is designed as a machine for stretching or puckering cloth, and sewing it while so stretched or puckered.

I have invented a machine containing the true principles for the production of a regular and uniform ruffle, and have made the same practically successful and valuable to the public.

One way in which ruffles are made by hand is that the operator with one hand folds a certain definite quantity of the cloth, and passes the fold thus made to the other hand, which holds the cloth down upon the table, while the folding-hand again returns and takes up another portion of the cloth, as nearly equal as the skill of the operator will allow, and brings that new portion forward in the shape of a fold to the holding-hand, which, by its pressure, creases the cloth and gives it a set, which is to be afterward secured by sewing or some other means. In this operation the hand which makes the fold must bring it within reach of the holding-hand, in order to secure the fold that has been made.

An improved hand-tool was made by Welcome Whittaker to aid in the forming of folds, for which improvement he obtained Letters Patent on the 14th of November, 1848.

These operations, thus performed imperfectly by hand and hand-tools, I propose to accomplish by my improved machine, and I, in part, imitate the operation by hand already described by bringing the fold which is made by the folding part of the mechanism up to a feeder, which seizes the fold, and which also passes it on through the machine to make room for a succeeding fold. My improved machine also sews the fold thus made before it leaves the machine.

The machine on which I exhibit one form of this invention is shown in the accompanying drawing, in which—

Figure 1:
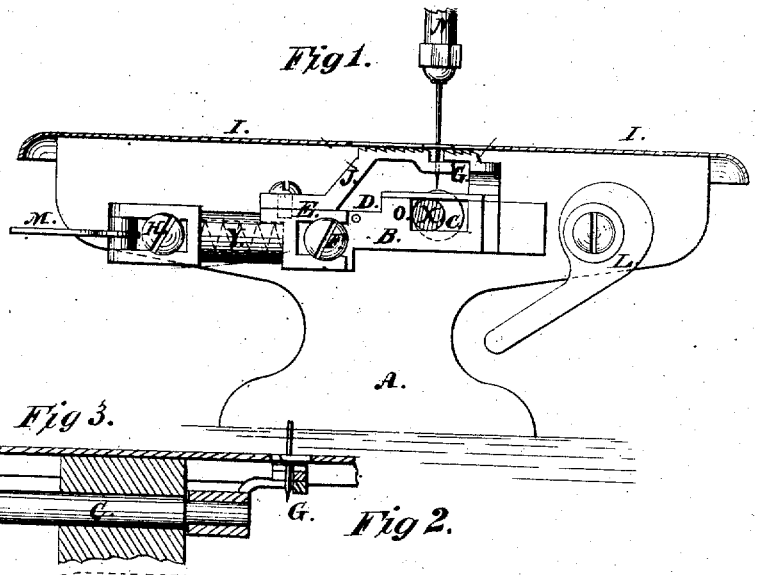
Figure 3:
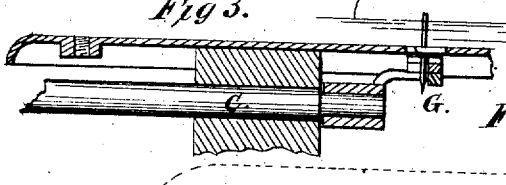
Figure 2:
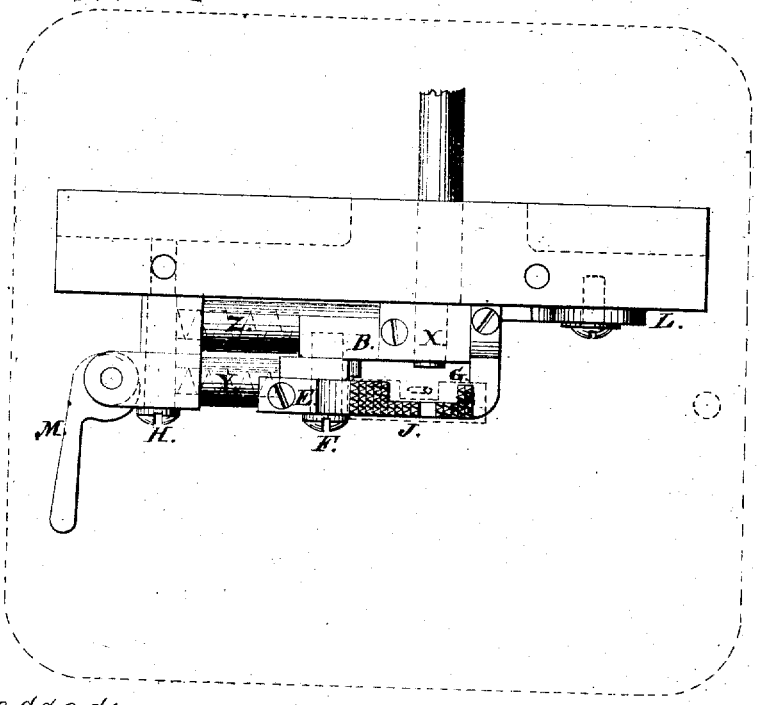

Figure 1 represents a sectional elevation of the machine. Fig. 2 represents a plan, partly in section, looking from above. Fig. 3 represents a vertical section through the machine in the line of the driving-shaft, and through the center of it.

In each figure similar letters represent similar parts.

The frame of the machine and the sewing apparatus connected therewith are similar to, and, in fact, are made from, the well-known form of the Willcox & Gibbs sewing-machine, to which the other parts are added, together constituting my invention.

A is the main frame of the machine. C is the revolving shaft of the machine, which is driven by the well-known means. On the inner end of this shaft is the eccentric pin X, which imparts the reciprocating movement to the devices employed in ruffling and feeding the cloth. The hook for looping the thread for sewing is at the end of the pin, but is not shown in the drawing, being a well-known device for that purpose.

E is the reciprocating feed-bar of the ordinary sewing-machine, to which the roughened surface J is attached, passing through the table of the machine I. This bar E is forked or slotted at its outward end, and is mounted upon a pin, H, which is fixed in the frame of the machine for that purpose, and which is straddled by the forked end of the bar E. Between the jaws of this forked end is mounted an eccentric cam, M, provided with a handle for the purpose of adjusting its position and regulating the throw of the feeding apparatus. This cam rests against the pin H when the feeding-bar E is at the extreme limit of its movement to the right, as the drawing appears to the observer; and it is apparent that as this cam is adjusted it will permit a longer or shorter movement of the feeding-bar before that movement is arrested by the pin H. A coiled spring, Y, is contained in the feeding-bar E, and by pressing against the pin H at one end of it, and against the feeding-bar at the other end, it continually forces the feeding-bar to the right, and would move it still farther than shown in the drawing if its motion were not arrested by the cam M.

The inner end of this feeding-bar is also provided with a slot, which straddles the eccentric pin F, which is screwed into the bar B. This pin F, by being turned on its axis with a screw-driver, will slightly raise or lower the feed-bar E, so as to change the position of the roughened surface J relatively to the bar B. The bar B receives motion from the revolving shaft C, and communicates motion to the ruffling apratus and to the feeding apparatus. This bar B is parallel to the feed-bar E, and at its outer end is provided with an open fork, by which it is mounted on and supported by the pin H. A spring, Z, arranged in a manner similar to the spring Y in the feed-bar E, tends to move the bar B away from the pin H, and to press it against the revolving eccentric pin X at the point of contact O, which pin X passes through a long slot in the bar B, whose width vertically is no greater than the diameter of the pin X, but whose length is at least as great as the length of the eccentric movement of that pin. When the shaft C revolves, the spring Z presses the bar B against the pin X at the point O, and, if there is nothing to prevent it, the bar B would follow the eccentric pin X in contact with it to the extreme end of its movement. To regulate, however, the extent of the movement of the bar B, the cam L is centered to the frame of the machine in such a position that the bar B will come in contact with its eccentric edge sooner or later, according to the position of the cam L, and when it does come in contact with this cam it cannot follow the eccentric pin X, and thus the length of its throw is limited.

Attached to this bar B is a roughened-surface feeding apparatus, G, which passes through the plate I of the machine in a manner similar to the ordinary roughened-surface feed.

In the bar B is a pin, D, so fixed that it will come into contact with the end of the bar E just in time to prevent the roughened surface G from coming into contact with the roughened surface J. As the shaft C revolves and carries the eccentric pin X away from the position shown in the drawing, the bar B follows the eccentric pin, and the bar E follows the bar B, both being driven in that direction by their respective springs. If the cam M is set so as to limit the travel of the bar E, the bar E will be arrested before the bar B has ceased to move, and the bar B will continue to follow the eccentric pin X either to the end of its movement, or so far as may be desired for the purpose of forming a fold, which distance will be determined by the set of the cam L. As the shaft C continues to revolve the movements will be reversed—that is to say, the ruffling-bar B will be first moved toward the bar E until the pin D comes into contact with it, after which the two bars will move together till the eccentric pin X has made its full stroke. By varying the adjustment of the cams M and L, the relative movements of the ruffling and feeding apparatus may be varied indefinitely, and any sized folds may be formed within the limits of the movements of the mechanism as constructed in any particular case.

N is the needle-bar, carrying a needle for the purpose of sewing down the ruffle when made.

Operation: The cloth to be ruffled is placed in the machine, and the cloth will then be pressed down upon the two roughened surfaces J and G, the effect of which must be to fold that portion of the cloth which lies between the ruffler G and the feeder J, because the feeder J holds fast the cloth at a point in advance of the portion which is to be folded, and the ruffler G advances upon that point, and, as a consequence, there must be slack cloth between these two points, which slack cloth, by the advance of the ruffler G, is doubled upon itself into a fold. A fold being thus formed, the next step is to pass it out of the machine, and, if desired, to sew it fast before it leaves the machine; and these operations are performed in the following manner: The ruffler G with the fold just formed, having overtaken the feeder J, continues its movements, taking with it the feeder J, and carrying the fold to where the feeder J traverses, and where it can be caught by the feeder J in its succeeding movement. In this position the fold is left under pressure, and the ruffler G and feeder J, by sinking, release their hold upon the ruffle, and retreat for a new operation. As the shaft revolves the feeder J retreats as far as the length of made ruffle which the machine is to deliver at each stroke of the feeder, which is determined by the set of the cam M, and the ruffler G retreats as much farther than the feeder J as the length of cloth which is required to be folded in the manner already described into the particular kind of ruffle to be made; and so this additional distance which the ruffler G retreats becomes the measure of the fold to be formed. And thus the operation is repeated, a new fold being formed by the ruffler G, and by it brought into the gripe of the feeder J, and a fold already formed being moved along by the feeder J at each operation of the machine. When it is desired to more permanently secure the ruffle before it is ultimately delivered from the machine, the well-known sewing mechanism shown and suggested in the drawing may be employed to stitch through the folds at every stroke of the machine when the cloth is at rest, in the manner well known for sewing any fabric which is passing under the presser-foot of a sewing-machine. When it is desired to vary the length of the fold, the ruffler G is adjusted by the use of the cam L, so as to have a longer or shorter movement; and it is obvious that the width of the fold may be indefinitely increased by increasing the length of this stroke of the ruffler G; and, in order to preserve the desirable pressure upon the cloth, the eccentric pin F may be turned with a screw-driver, the effect of which will be to raise or lower the level of the surface of the feeder J relatively to the level of the surface of the ruffler G. It must be evident now that my machine forms a ruffle in essentially the same way as I have said it was sometimes formed by hand—that is to say, the ruffler G forms the fold by the assistance of the feeder J, which holds the material in advance of the ruffler G at a definite distance, which distance measures the length of the fold to be formed, and the ruffler G also delivers the fold thus formed to the feeder J, which presses it and passes it out of the machine.

I do not limit myself to the special devices for ruffling or feeding which are exhibited in my machine, as these devices are simply equivalents of analogous devices, which have been used in sewing-machines for the purpose of feeding the cloth in these machines; neither do I claim two distinct feed-wheels having a differential motion, for this is already patented.

It is also apparent that any of the various kinds of sewing-machines may be used to secure the ruffle formed by means of the combination described, and that, if no needle is used at all, the machine will fold and deliver a creased ruffle, which may subsequently be sewed, if desired.

What I claim as my invention, and desire to secure by Letters Patent, is—

1. A machine composed of a ruffler and a feeder, in which the ruffler folds the cloth to be ruffled and brings the fold up to the feeder, and the feeder holds the cloth, as described, in advance of the ruffler while the fold is being formed, all substantially in the manner described.

2. A machine composed of a ruffler and a feeder, substantially as described, in which the relative movements of the ruffler and feeder measure the width of fold to be formed, and in which the ruffler folds the cloth to be ruffled and brings it up to the feeder, and the feeder holds the cloth, as described, in advance of the ruffler while the fold is being made, and afterward feeds the formed ruffle through the machine, all substantially in the manner set forth.

3. A machine composed of a ruffler and a feeder, substantially as described, in which the relative movements of the ruffler and feeder measure the width of the fold to be formed, and in which the ruffler folds the cloth to be ruffled and brings it up to the feeder, and the feeder holds the cloth, as described, in advance of the ruffler while the fold is being made, and afterward feeds the formed ruffle through the machine, in combination with a sewing mechanism, substantially as set forth.

4. In a ruffling-machine, the combination of a reciprocating ruffler and mechanism, substantially as described, for increasing or decreasing at pleasure the throw of the same, for the purpose of regulating the size of fold, substantially as set forth.

5. The combination, with the feed of a sewing-machine, of a reciprocating ruffler and mechanism, substantially as described, for adjusting the throw of the same independently of the feed, substantially as set forth.

6. In a ruffling-machine, a reciprocating ruffler whose forward movement to make the ruffle terminates invariably at the same point, and whose throw for the purpose of determining the size of the fold to be made by it is regulated by increasing or decreasing the extent of its backward or retreating movement, substantially in the manner described.

GEO. B. ARNOLD.

Witnesses:

A. H. PRICE,

JNO. R. LEFFERTS.